March 26, 1968

M. D. MARKS 3,374,631

COMBINATION SUBSONIC AND SUPERSONIC
PROPULSION SYSTEM AND APPARATUS

Filed Aug. 16, 1965

INVENTOR.
MARVIN D. MARKS
BY
Gravely, Lieder & Woodruff
ATTORNEYS

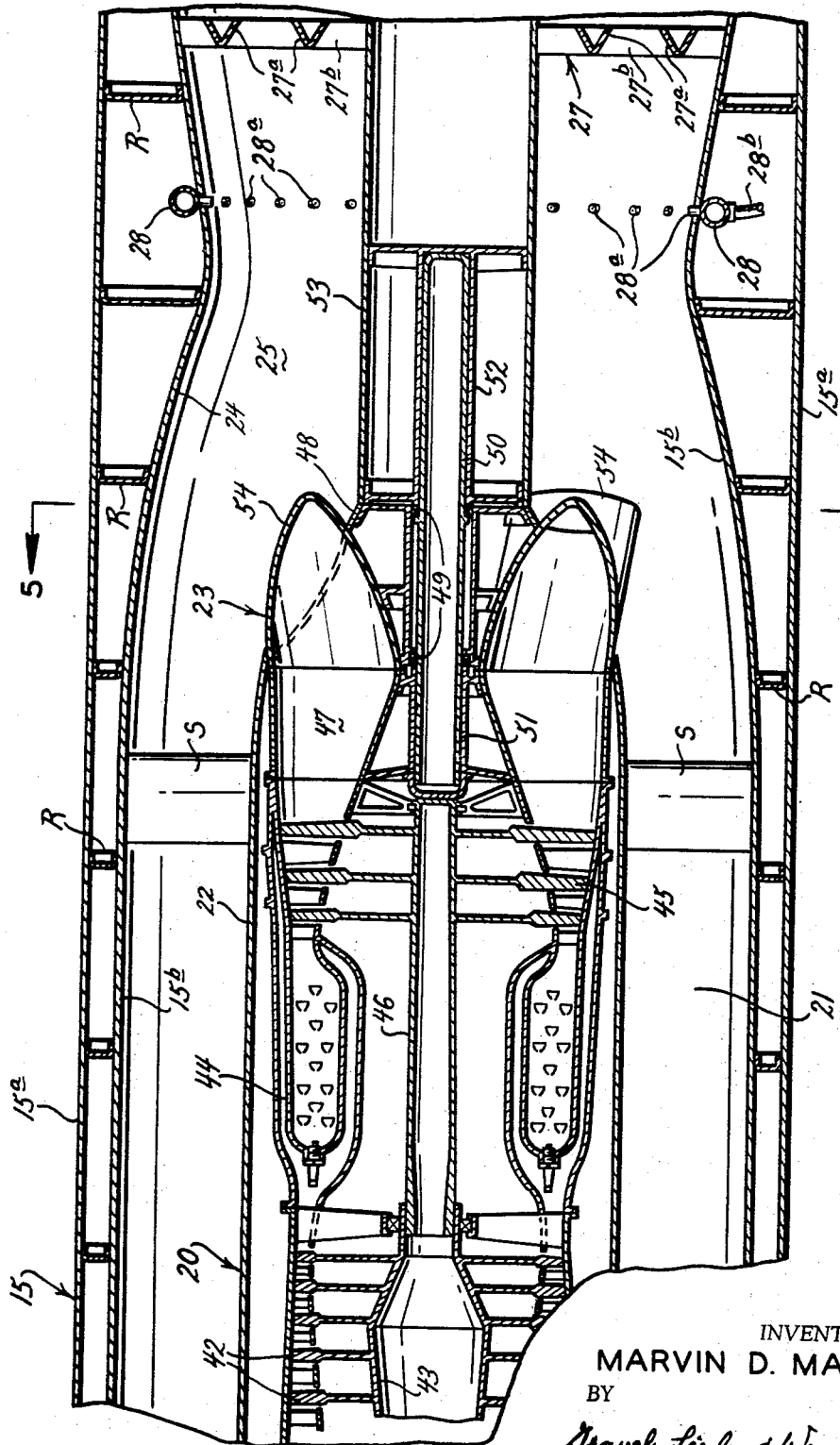

March 26, 1968
M. D. MARKS
3,374,631
COMBINATION SUBSONIC AND SUPERSONIC
PROPULSION SYSTEM AND APPARATUS
Filed Aug. 16, 1965
5 Sheets-Sheet 3
FIG. 5.
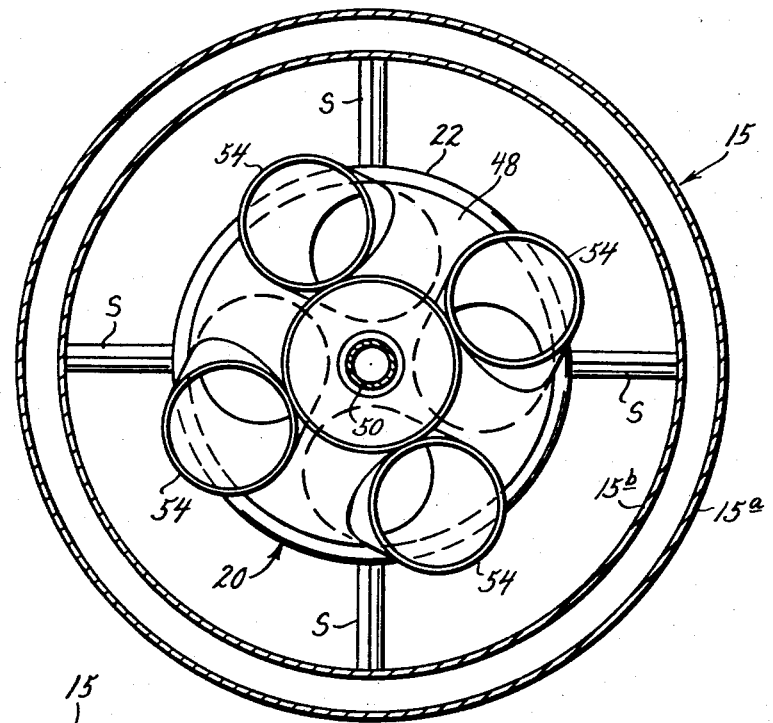
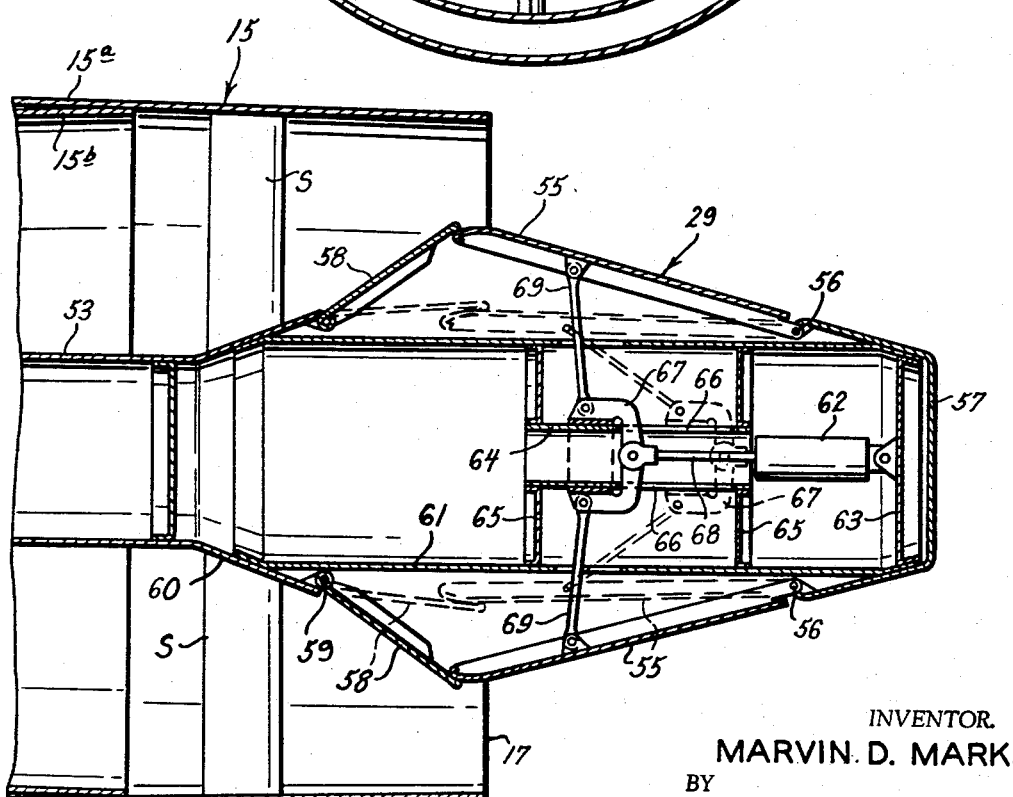
FIG. 4.
INVENTOR.
MARVIN D. MARKS
BY
Gravely, Lieder & Woodruff
ATTORNEYS

INVENTOR.
MARVIN D. MARKS

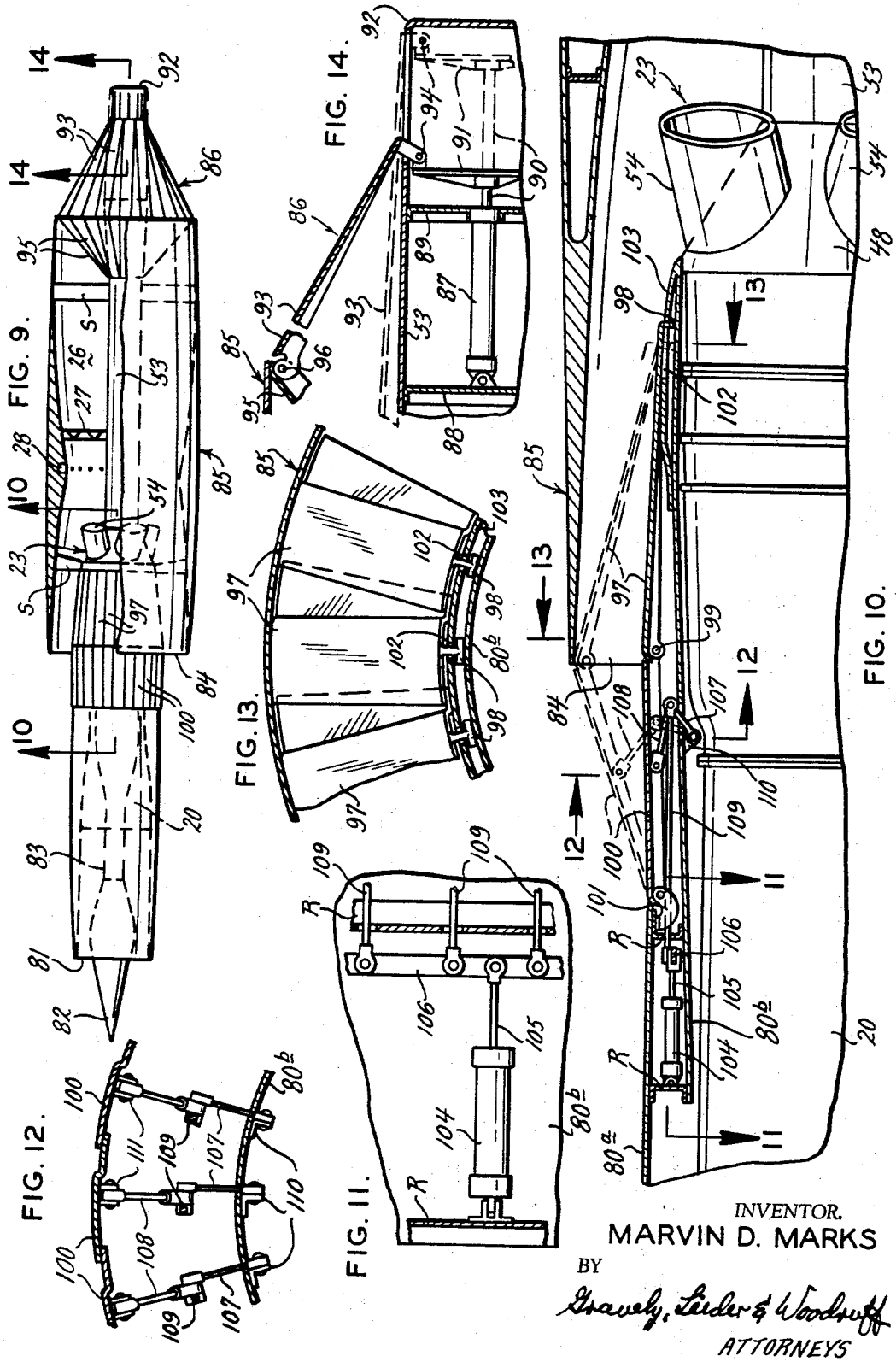

United States Patent Office 3,374,631
Patented Mar. 26, 1968

3,374,631
COMBINATION SUBSONIC AND SUPERSONIC PROPULSION SYSTEM AND APPARATUS
Marvin D. Marks, Hazelwood, Mo., assignor to McDonnell Aircraft Corporation, St. Louis, Mo., a corporation of Maryland
Filed Aug. 16, 1965, Ser. No. 480,045
8 Claims. (Cl. 60—244)

ABSTRACT OF THE DISCLOSURE

A combination propulsion apparatus of a turbojet engine positioned in axial alignment with a ramjet propulsion casing such that both engine and ramjet are able to operate together, and including a spin-jet thrust device driven by the exhaust gas from the turbojet engine for augmenting the overall thrust developed by the combined apparatus.

---

This invention relates to improvements in combination subsonic and supersonic propulsion systems for high speed aircraft and to apparatus by which the propulsion systems are rendered useful.

The propulsion system disclosed herein includes a new and unique combination of a turbojet engine with spin-jet thrust augmentation for flight operation at low Mach number, a ramjet engine with spin-jet thrust augmentation for flight operation at intermediate Mach number, and a pure ramjet engine at high Mach number.

A turbojet engine, as is well known, is an airdependent thermal jet-propulsion device using an exhaust-gas driven turbine wheel to drive an axial-flow compressor. The turbojet engine of the present invention is supplied with a large mass of air through a variable area inlet with part of the air mass being by-passed around the engine to an interaction zone in advance of an afterburner-ramjet section. In the system of this invention the turbojet exhaust and the by-pass air mass is interacted by a spin-jet device that augments the flow into the afterburner zone. The gas mass is exhausted through a variable area exhaust nozzle to obtain the thrust.

The ramjet engine is commonly known to comprise a duct open at both ends with a fuel-injection system for creating the high-pressure gases in a continuous flow in which combustion is continuous. The burning is continuous and self supporting with a flame holder to prevent the flame front from being swept too far toward the exexhaust nozzle and to insure that the combustion temperature will remain high enough to support combustion. In the present invention the ramjet engine is augmented by a spin-jet device for an intermediate Mach number, and at high Mach number the propulsion system is a pure ramjet engine. Since a pure ramjet cannot develop static thrust, it must be boosted to a suitable speed so that the ram air entering the diffuser zone can develop a pressure barrier high enough to restrict the escape of the combustion mass to the exhaust nozzle only.

The usual induction of secondary air flow by shear forces between primary jets and a secondary gas, as air, is a simple though inefficient means for energy transfer and thrust augmentation. It is particularly inefficient at elevated primary gas temperatures. So far, the successful application of such flow induction methods to jet or rocket propulsion systems has been limited by the low efficiency and by the bulky mixing ducts required in spite of the mechanical simplicity thereof. The bulk of such means necessarily introduces increased drag due to the large frontal and surface area involved. These difficulties are all changed with the present introduction of rotary or spin-jets which transfer part of their energy and momentum to the secondary gas flow by interface pressure forces rather than by shear forces. Thus the spin jets are a simple expedient for increasing the efficiency and they also greatly reduce the length of the interaction zone. In hypersonic propulsion the use of rotor blades (as in the fan jet) is excluded for temperature limitations, but the rotary or spin-jet flow induction or pumping action is unlimited. It has been found that performance improvements from spin-jets over ejector performance is especially significant when the primary gas temperature is higher than the secondary gas temperature.

As will be hereinafter disclosed, the fixed exhaust nozzle of the turbojet engine is modified or replaced by a rotary device having a plurality of nozzles with tangentially canted axes which discharge the high temperature gas into a ring shaped interaction duct. The reaction of the spiral jets of hot gas is utilized to spin the rotary nozzle device so that the gas forms spirals inside the duct which pump or push the lower temperature secondary gas trapped between the spirals. Though mixing of the two gases is unavoidable, it is the interface pressure force, not the mixing process, which produces the major energy and momentum transfer between such flows.

The preferred arrangement is a tandem combination of turbojet and ramjet engines with augmentation of the turbojet by a spin-jet device and an afterburner which is in the form of a ramjet. By augmenting the turbojet it is immediately possible to use a smaller turbojet, as the spin-jet increases the pressure in the interaction zone by its pumping action which boosts the thrust and decreases the specific fuel consumption. The tandem combination simplifies the structural problems and makes it unnecessary to have separately mounted propulsion means to take care of the low and high speed ends of the flight speed range.

A principal object of this invention is to provide spin-jet apparatus for high Mach number propulsion systems, and to combine such spin-jet with a jet engine, ramjet and afterburner system.

It is another object of this invention to provide a combination turbojet-ramjet propulsion system and spin-jet device to obtain a power plant for aircraft having capability of adequate thrust at low Mach number and carrying on for high Mach number.

It is also an object of this invention to use the spin-jet as an energy transfer device so that it may be combined with a jet engine in a multipurpose power plant having an increased range of by pass ratios without encountering the depreciation of transfer efficiency or without great increase in weight of the system, or without the stall problem prevalent with mechanical energy transfer devices.

Another object of this invention is to combine a jet propulsion engine with a spin-jet device to provide a highly flexible operational unit with good over all design characteristics.

Yet another object of this invention is to provide a novel propulsion system having low Mach number turbojet operation and convertible to high Mach number ramjet operation by arranging the ducting to be open through the energy transfer section.

Still another object of this invention is to provide a propulsion system with an afterburner and to improve the afterburner operation by the pumping action of the spin-jet device.

It is a further object of the invention to combine a turbojet, spin-jet and afterburner in a simple assembly thereby making it possible to use higher by pass ratios without undue weight penalties, and to improve the altitude ceiling for aircraft by appropriate selection and scheduling of by pass ratio with altitude and forward velocity.

Yet another object of this invention is to provide a combined turbojet-ramjet engine with a by pass and to apply a spin-jet device for interacting the jet flow and by pass flow in advance of air afterburner for improving the flexibility of the propulsion system and to obtain improved fuel consumption by varying the by pass ratio through each flight condition.

Further objects and advantages will become apparent from the following description of preferred embodiments of the invention, with reference to the accompanying diagrammatic drawings, wherein:

FIG. 3 is a greatly enlarged fragmentary sectional view of the engine taken at line 3—3 in FIG. 1;

FIG. 4 is an enlarged fragmentary sectional view of the engine taken at line 4—4 in FIG. 1;

FIG. 5 is a transverse sectional view of the engine taken at line 5—5 in FIG. 3;

FIG. 9 is a partly sectioned longitudinal view of a modified engine following the principles of this invention;

FIG. 10 is a greatly enlarged fragmentary longitudinal sectional view of the modified engine of FIG. 9 showing the by pass control;

FIG. 11 is a fragmentary detailed view taken at line 11—11 in FIG. 10;

FIG. 12 is a further fragmentary detailed view taken at line 12—12 in FIG. 10;

FIG. 13 is a further fragmentary detailed view taken at line 13—13 in FIG. 10;

FIG. 14 is a further fragmentary detailed view taken at line 14—14 in FIG. 9.

Figure 1:
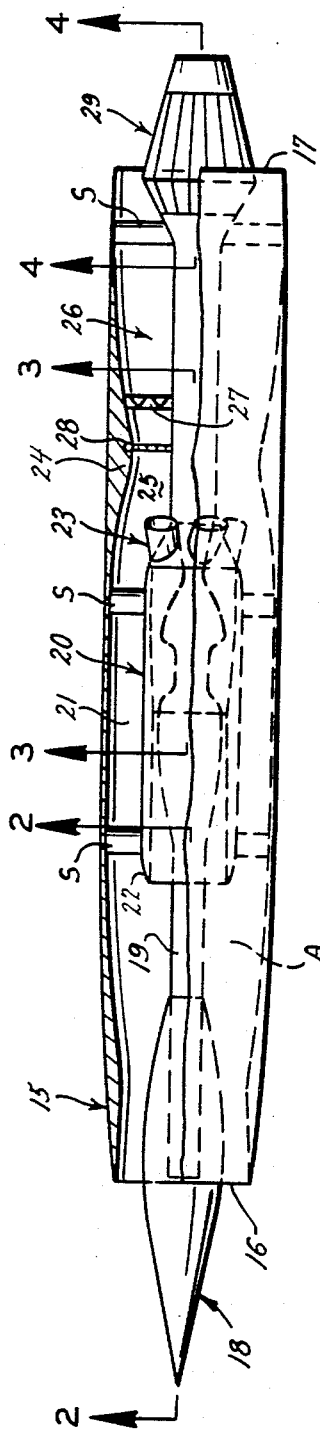
FIG. 1 is a partial longitudinal sectional view of a combined turbojet-ramjet engine showing its components diagrammatically and including a spin-jet device and afterburner.

Referring to FIG. 1, the combination propulsion system is seen to comprise a longitudinal casing diagrammatically shown at 15 having an air inlet end 16 and an exhaust end 17. Primary and secondary air enters at the inlet end 16 under the control of a spike 18 translatable on a shaft 19. The primary portion of the entering air supplies the requirements of the turbojet engine indicated generally at 20. The turbojet engine is supported by suitable struts S connected to the casing 15, and is of known arrangement and need not be explained in detail. The secondary air supplied at inlet 16 flows axially into the by pass duct 21 formed between the casing 15 and the housing 22 for the turbojet engine 20. Suitable strut members S retain the turbojet engine housing 22 in position within casing 15.

At the aft end of the turbojet engine 20 there is operably disposed the spin-jet device indicated generally at 23. At the rear of the device 23 the casing 15 is constricted by the inwardly projecting wall 24 to form the inlet of a ramjet in which an interaction zone 25 opens to an expanding or diffuser zone 26 in which a suitable flameholder device 27 is disposed downstream from a suitable fuel injector ring 28 having a plurality of nozzles 28A and a supply conduit 28B. The exhaust nozzle 17 of the casing 15 is controlled by a variable exit nozzle control device, generally indicated at 29.

It is thus seen that the propulsion system of FIG. 1 combines a turbojet 20, a spin-jet 23, and a ramjet 25–26. This system will be described in more detail in FIGS. 2, 3, 4 and 5. For example, the diagrammatic showing of the casing 15 in FIGS. 1, 2 and 4 may actually comprise a suitable structure such as is shown in FIG. 3 where the outer skin 15A and the inner shell 15B are spaced by circular or suitably shaped ribs R that vary in rib width to support the inner shell 15B in the desired configuration shown in FIG. 1.

Figure 2:
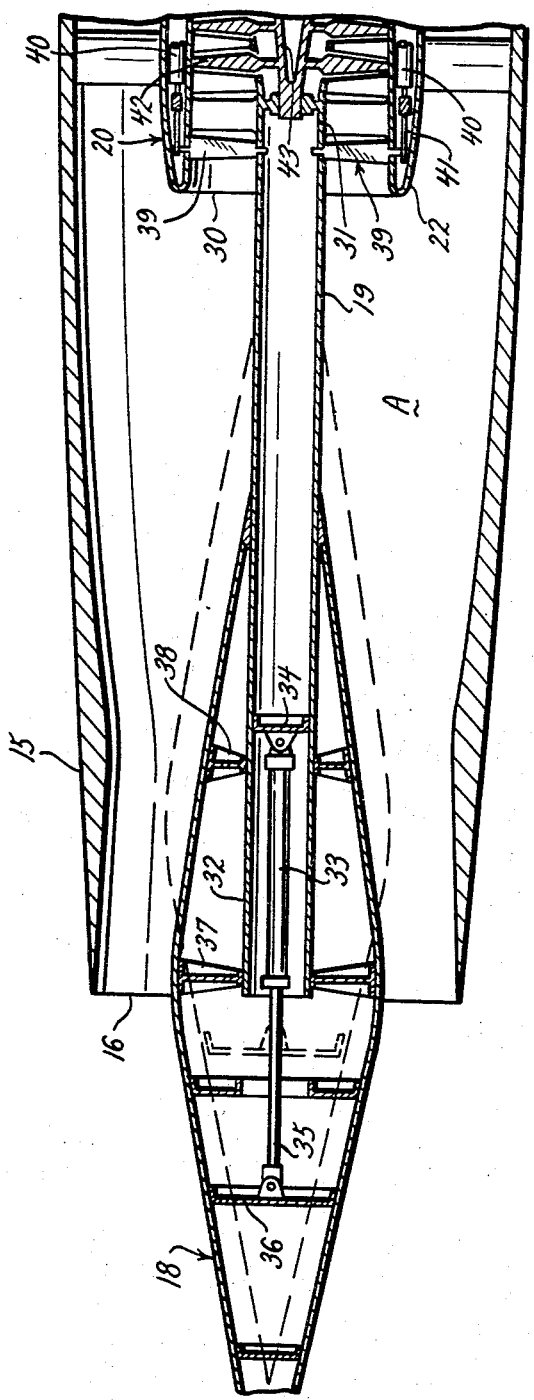
FIG. 2 is an enlarged fragmentary sectional view of the engine taken at line 2—2 in FIG. 1.

In FIG. 2, the inlet end 30 of the turbojet engine supports one end 31 of the shaft 19, the opposite end 32 being used to house a fluid pressure motor 33 with one end supported on a bracket 34 and the operating end of the push rod 35 being connected to a bulkhead 36 within the shell of the spike 18. The spike 18 is a reversely varying or divergent-convergent tapered body having its tapering inner portion supported on bearing members 37 and 38 that slide on the shaft 19. The spike 18 is shown in extended full line position with its larger section substantially at the inlet end 16, the retracted broken line position being shown to illustrate the variable area inlet formed between the largest section of the spike and the interior surface of the casing 15 inwardly of the inlet end 16. The inlet area is, therefore, controlled by the spike 18 sliding on the shaft 19 actuated by motor means 33 supplied by a suitable source (not necessary to show) of pressure fluid. As the throat area A of casing 15 increases the incoming air has a reduced velocity to meet the requirements of primary air for the turbojet engine 20 and the secondary air flows into by pass duct 21 around the turbojet engine 20. The primary air passes into engine 20 through a multi-vane inlet valve shown generally at 39. The vanes are concurrently controlled by one or more fluid pressure motors 40 suitably connected by the actuator members 41. The primary air is compressed by the compressor blades 42 carried by a conventional type rotor 43 (FIGS. 2 and 3).

The compressed air flows axially into a burner chamber 44 (FIG. 3) and flows to the turbine section 45. The blades of the turbine drive the shaft 46 which, in turn, drives the compressor rotor 43. The hot gas mass on leaving the turbine 45 exhausts at velocity into the spin-jet device 23 at the expanding annular passage 47. The device 23 comprises a rotor member 48 rotatably carried by bearings 49 on the support spindle 50. The forward end of spindle 50 is sleeved in bearing tube 51 at the aft end of the turbine 45, and the aft end of spindle 50 is sleeved in a bearing tube 52 carried by the forward end of tubular boom member 53 that extends axially aftwardly to support the exhaust nozzle control device 29 (FIG. 4). The presence of boom member 53 axially of the casing forms the space within the casing interactive zone into a ring-shaped chamber.

The spin-jet device 23 (FIGS. 3 and 5) comprising the free-wheeling rotor 48 has a special configuration in which a plurality (four being shown) of angularly twisted or skewed exhaust nozzles 54 project rearwardly. The nozzles 54 have tangentially canted axes which discharge the gas into the interaction zone 25. As seen in FIG. 5, the nozzles 54 are inclined rearwardly in a counter clockwise direction, and each thereof may be canted at approximately an angle of from 10 to 25 degrees to the plane of the view of FIG. 5. As a consequence the gas mass flowing through the nozzles 54 develops a reaction which imparts rotation to the spin-jet rotor 48, thereby causing the gas mass to form spirals inside the casing setting up a plurality of streams of cohesive gas that have separate identity in the interaction zone 25 of the casing 15 from the air mass flowing in the by pass duct or passage 21.

In tests it has been found that a mass flow ratio of secondary air to primary air of approximately 4, the optimum spin angle of the nozzles 54 was of the order of 25 degrees, with the ratio of primary air temperature to secondary air temperature equal to one. As the mass flow ratio of secondary air to primary air increased the optimum spin angle decreased, so that at a mass flow ratio of about 9, and with a primary to secondary air temperature ratio of about 4, the optimum spin angle was about 21 degrees. Thus, by increasing the primary gas temperature and using a somewhat smaller spin angle both maximum mass flow ratio and thrust augmentation are substantially increased. Using helium as the primary gas in place of air the optimum spin angle is reduced and still larger increases in secondary mass flow and augmentation ratios are produced. When the spin angle gets smaller than about 10 to 15 degrees there is a severe drop in augmentation caused by the jet flow being deflected radially inwardly by the Coanda effect on the inner duct wall. On the other hand, a much larger spin angle than 25 degrees also decreased the augmentation because of the effect of splashing of the jet against the outer duct wall.

Looking now at FIGS. 1, 3 and 4, it can be seen that the combined flow of by pass air and the hot gas discharge from the spin-jet device 23 moves into the interaction zone 25 and afterburner zone 26 where fuel from a spray ring 28 is supplied thereto. The flame front of the burning mass is stabilized by a suitable flameholder device 27. One such device may consist of V-shaped rings 27A supported by radial members 27B in a conventional assembly. The zones 25 and 26 within the shell 15B constitute a ramjet, and the hot gases exit at the exhaust nozzle 17 under the control of the exhaust nozzle device 29. The nozzle control device 29 (FIG. 4) is composed of a plurality of leaves 55 that are cooperatively organized in a circular form and overlap at adjacent longitudinal sides. The leaves are pivoted at 56 at the trailing end cover 57, and each forward end of the leaves 55 engages a leaf element 58 that is pivoted at 59 on the flared end 60 of the tubular member 53. The form and manner of constructing the leaves and leaf elements of the exhaust nozzle 29 is conventional. As may be seen in FIG. 4 the flared end 60 of the tubular member 53 supports a hollow member 61 in which a pressure fluid motor 62 is disposed with its base end pivoted on plate 63 just inside cover 57. The member 61 carries a slide guide 64 supported by spaced ribs 65, and the guide 64 is longitudinally slotted at 66 so that collar 67 can slide on the guide 64 with a radial portion thereof movable in the slots 66. The actuating rod 68 of the motor means 62 is connected to the radial portion of collar 67, and through the collar actuates as many push-pull links 69 as there are leaves 55 for expanding or contracting the nozzle control device 29. The leaves 55 are shown in full line when expanded and in broken line when contracted.

Figure 6:
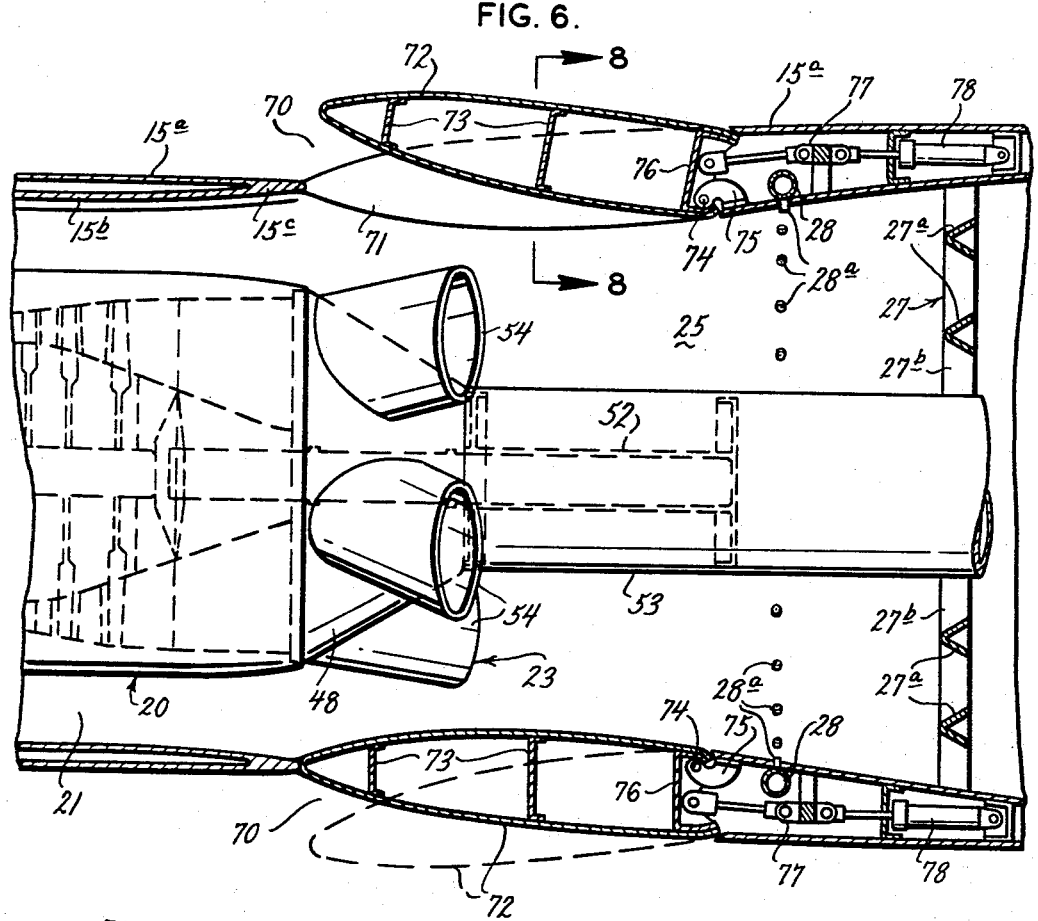
FIG. 6 is a greatly enlarged fragmentary longitudinal sectional view of the engine of FIG. 1, but with certain modifications as to the by pass means.
Figure 8:
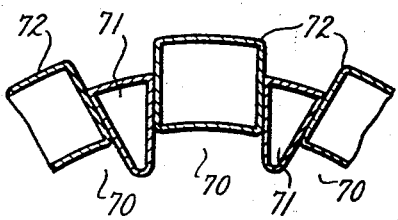
FIG. 8 is a fragmentary transverse sectional view taken at line 8—8 in FIG. 6.
Figure 7:
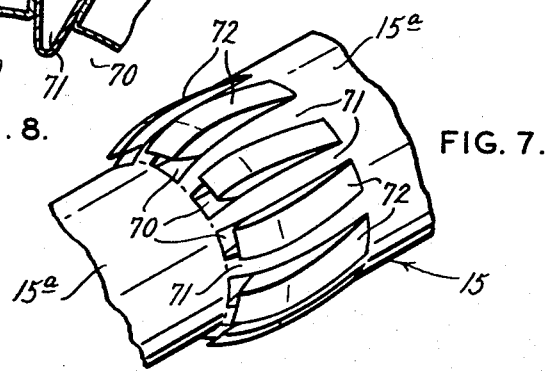
FIG. 7 is a fragmentary perspective view of the modified engine of FIG. 6.

Turning now to FIGS. 6, 7 and 8, a modified turbojet engine by pass means is shown. The left hand portions (not shown) in FIG. 6 are the same as those portions shown in FIGS. 2 and 4 and no description of the same will be necessary. The essential difference over FIG. 3 is that in FIG. 6, the casing 15 has its skin 15A and shell 15B tapered to a thin section 15C radially opposite the spin-jet device 23, and at this zone the casing has the inner shell 15B and the outer skin 15A slotted at 70 at a plurality of places spaced circumferentially about the structure as seen in FIG. 7. The slots (FIGS. 7 and 8) are defined between fixed structures 71 that are structurally connected to the casing section 15C. The structure 71 is triangular in transverse section (FIG. 8) and in longitudinal section it has an airfoil configuration. Thus, the contour of the fixed structure adjacent the spin-jet device 23 forms the desired shape for the by pass air inlet to interaction zone 25 in advance of the afterburner fuel spring ring 28 and the flameholder 27.

Each slot 70 is controlled by a valve number 72 that is rectangular in transverse section and air-foil shaped in longitudinal section. Each member 72 has its skin sheets braced by ribs 73, and each thereof is pivoted at 74 from a bracket 75 on the shell 15B. A rib member 76 provides the structure by which the push-pull member 77 of a pressure fluid motor means 78 is able to cause the valve 72 to move. Each valve 72 has its own motor means 78, but it is also understood that the valves 72 may have a common actuator mechanism responsive to one or more motor means (not shown). The means disclosed in FIGS. 6, 7 and 8 is used during subsonic operation when additional secondary air is required. The valves 72 are moved to open the slots 71 by actuating the motor means 78. The shape of the interaction zone 25 is such that a maximum of secondary air from slots 71 and from the by pass duct 21 is entrained with the high energy primary air flowing from the spin-jet device 23. The combined mixture enters the afterburner and ramjet zones 25–26 after which it is exhausted through the exhaust nozzle 17 under control of a device similar to that shown in FIG. 4. When the ramjet 25–26 is operating at supersonic speed the inlet valves 72 are closed, as are the inlet valves 39 for the turbojet 20 (FIG. 2), thereby preventing flow through the turbojet 20 and into the slots 70. The air supply for the ramjet is through duct 21.

Considering now the modified propulsion system of FIGS. 9 and 10, it is seen that the turbojet 20 heretofore referred to is mounted in casing 80 having the inlet end 81 controlled by a longitudinally movable spike 82 (similar to spike 18) carried on shaft 83 and actuated by motor means (not shown) similar to that disclosed in FIG. 2. The casing 80 includes an outer skin 80A and an inner shell 80B (FIG. 10) spaced by suitable ribs R such as is shown in FIG. 3. The turbojet 20 has the spin-jet device 23 operably mounted as heretofore disclosed for rotary movement, and supported on axial member 53. The spin-jet device 23 and the turbine portion of the turbojet 20 are disposed within the inlet end 84 of a casing 85 that forms the ramjet and afterburner combination. The afterburner includes the flameholder 27 and fuel spray ring 28, and the exhaust gases are controlled by an exit nozzle device 86 somewhat differently constructed from the nozzle 29 of FIG. 4.

Looking at the fragmentary view of FIG. 14, the exit nozzle device 86 is assembled around the trailing end of the tubular member 61, and includes a motor means 87 pivoted on rib 88 and extending through another rib 89 so that its push-pull member 90 can be secured to a thrust plate 91 enclosed by the end cover 92. The thrust plate 91 actuates a plurality of overlapped leaves 93 (of known configuration) by means of the connection 94. The leaves 93 are operably connected to a similar plurality of overlapped leaves 95 at pivot joints 96, the leaves 95 having fixed pivoted ends at the member 61 (see FIG. 4). When the leaves 93 are fully contracted they will lie along the member as shown in broken line in FIG. 14; and when fully expanded the leaves 95 substantially close the exhaust nozzle 84A as seen in FIG. 9.

The operation of the ramjet portion of the propulsion system of FIG. 9 is controlled by an inlet device having a plurality of overlapped leaves 97, each of which has a T slide anchor 98 at its after end. The opposite end of the leaves are pivotally connected at 99 to the ends of a set of ramp leaves 100. The ramp leaves 100 are connected to fixed pivots 101 carried by the skin 80A. The remote ends of the leaves 97 have the T slides movable in guide slots 102 in the sheet metal ring 103. The latter ring 103 is spaced around the shell 80B to form a recess closed except for the slots 102. Movement of the leaves 97 and 100 is controlled by motor means 104 having its push-pull rod 105 connected to a ring 106. The ring circles the turbojet 20 and is connected to thrust rods 109 to actuate the same together. The rods 109 are connected to the adjacent ends of links 107 and 108, the remote ends of links 107 being pivoted at the fixed brackets 110 and the remote ends of links 108 being pivoted to the ramp leaves 100 at brackets 111. During ramjet operation the air is supplied at inlet 84 and the turbojet 20 is closed by vanes 39 seen in FIG. 2, thereby inactivating the spin-jet device 23.

In the foregoing description there has been disclosed certain preferred propulsion systems, such as those of FIGS. 1, 6 and 9. The systems of FIGS. 6 and 9 are modifications of each other, and both are modifications of FIG. 1. In FIG. 1, the propulsion system has a wide range of flexibility with the turbojet 20 being selectively controlled by the longitudinal setting of the spike 18 or a combination of settings of the spike 18 and exhaust nozzle device 29. For low Mach number the turbojet 20 is used, but there is greater efficiency obtained as the turbojet exhaust of a high energy gas mass is through the spin-jet device 23 which spins and directs the exhaust gas in a spiral flow to produce a pumping action on the secondary air that by passes the turbojet 20 in duct 21. The gas mass exhausted from each canter nozzle 54 remains in a cohesive state while spirally moving about the member 53 and translating axially in the zone 25. The gas mass interacts with the flow of by pass air in duct 21 and impart energy to the by pass air flow. The shape of the outer wall of the interaction zone 25 converts pressure to velocity so that the mass of gas picks up momentum at the zone where the energy of the primary gases from the spin-jet 23 is imparted to the secondary by pass air issuing from duct 21. In this state the primary gas flow is in the form of spiral masses that act as energy transfer means or blades which accelerates the secondary air from duct 21 and compress the same. The two masses of fluid are led to a space where fuel is injected and burned thus adding energy which increases the thrust at the exhaust nozzle 17.

In the propulsion system of FIG. 1 the turbojet 20 and the spin-jet 23 may be employed for low Mach number where the secondary by pass flow is small in relation to the primary flow from the spin-jet. The ratio of primary gas flow to secondary flow may be adjusted by moving the spike 18, and the thrust at the exhaust nozzle 17 may be adjusted by varying the position of the leaves 55 in the nozzle device 29 to increase or reduce the exhaust area. The adjustments of spike 18 and device 29 may be manual or coordinated through suitable hydraulic or other means.

When there is need for more speed the system of FIG. 1 can boost the propulsion by adding fuel at the nozzle ring 28, thereby activating the afterburner and initiating the function of a ramjet with augmentation from the spin-jet 23. In this mode of operation the flameholder 27 maintains the flame front from being blown too far rearwardly, and the ratio of by pass air from duct 21 is increased in relation to the primary gas flow through the turbojet 20 and spin-jet 23, whereby intermediate Mach number velocity is attainable.

For high Mach number velocity the turbojet is shut off by closing the vanes 39 so that the air flow is directed into by pass duct 21. The zones 25 and 26 then act as a pure ramjet with the afterburner in operation and the nozzle device 29 in more open position to enlarge the area of the exhaust nozzle 17. The high Mach number ramjet operation is possible because the casing 15 is completely open through the energy transfer zones 25 and 26.

In the modification shown in FIG. 6, the turbojet and spin-jet propulsion function is similar to that described in connection with FIG. 1, except that the valve members 72 would be in open position at the low end of the speed range. The demand for more speed would be accompanied by closing of valve members 72 so that the configuration of the apparatus would be as in FIG. 1. For high Mach number propulsion, the vanes 39 in the turbojet 20 are closed, as are the valve members 72 so that pure ramjet propulsion is obtained as before described.

The modification of FIG. 9 places the turbojet casing 80 substantially in advance of the by pass air inlet 84. However, control of the by pass ratio of primary to secondary air is provided by the leaves 97 and ramp leaves 100. In pure ramjet operation the leaves 97 and 100 are opened and the turbojet is shut off.

The foregoing rotary jet flow pumping action provides an efficient fluid energy transfer means from a primary to a secondary flow over a wide range of secondary to primary mass flow ratios. The rotary jet flow device is as simple as an ejector but requires no lengthy mixing duct, and has considerably higher energy transfer efficiency. In accordance with the above disclosure, the fluid energy transfer from the hot primary gas (such as is generated in a turbojet engine) to the secondary ambient gas can produce a sizable thrust augmentation and corresponding savings in specific fuel consumption. The greater flexibility of the spin-jet device over the present types of fan jets makes it possible to operate a given engine assembly in the subsonic speed range in the mode of a high by pass ratio turbofan, and in the high supersonic flight speed range of the order of Mach 3 or more in the mode of a ramjet. It is especially significant for air breathing propulsion systems, but the same combination will have utility when applied to systems using other than air.

In the foregoing description there has been disclosed the novel combination of turbojet engine, spin-jet and afterburner in a combined multiple purpose propulsion means having an increased range of by pass ratios without encountering the loss of transfer efficiency, substantial increase in weight, or stall problems prevalent with mechanical energy transfer devices, as a result the system provides a highly flexible operational apparatus with good overall characteristics. Because of the attainment of higher by pass ratios without undue weight penalties, altitude ceiling is improved by appropriate selection and scheduling of by pass ratio with altitude and forward speed. Also fuel consumption is improved since the variable by pass ratio allows selection of the optimum by pass ratio at each flight condition.

While certain preferred forms of the combination propulsion apparatus have been shown and described it is understood that variations therein may be made without departing from the scope of the appended claims.

What is claimed is:

1. In an air breathing propulsion apparatus the combination of an elongated casing means having axially spaced inlet and outlet ends, a turbojet engine carried by said casing means adjacent said inlet end and having an air entrance end and an axially spaced exhaust end located between said ends of said casing means, a boom member extending axially through said casing means from adjacent said turbojet engine exhaust end to adjacent said outlet end of said casing means, a spin jet device rotatably mounted on said boom member and enclosing said turbojet engine exhaust end, said spin-jet device having a plurality of nozzles the axes of which are tangentially canted relative to the longitudinal axis of said casing means to form said turbojet engine exhaust gas flow into spiral streams, said casing means having an inner wall downstream of said spin-jet device formed with convergent and divergent sections, said spiral streams of exhaust gas pumping air through said casing means from said inlet end and in by pass of said turbojet engine, said pumped by pass air and said spiral streams comingling at said convergent wall section, fuel nozzle means mounted in said casing means adjacent said divergent wall section in said casing means, and flameholder means in said casing means downstream of said fuel nozzle means.

2. The combination set forth in claim 1 wherein said nozzle members having their axes canted at angles of from 10 degrees to 25 degrees.

3. The propulsion apparatus set forth in claim 1 and including air flow control means at said casing means inlet, and other exhaust gas flow control means at said outlet means to regulate the thrust reaction of said apparatus.

4. The propulsion apparatus set forth in claim 1 and including inlet air flow control means operably mounted in said casing means adjacent said spin-jet device and upstream of said convergent inner wall section.

5. In a jet thrust propulsion apparatus, a turbojet engine having intake and exhaust ends, a ramjet engine including an axially open casing having an inlet end and a jet thrust exhaust end, said ramjet engine casing having an inner wall formed intermediate its ends with a convergent-divergent section, said turbojet engine being mounted in said casing inlet end in spaced relation to said inner wall to provide a flow passage in by pass of said turbojet engine, the exhaust end of said turbojet engine being located in advance of said convergent-divergent section a support means extending rearwardly in said casing from adjacent said turbojet engine exhaust end, a spin-jet device rotatably mounted on said support means of said turbojet engine and having a plurality of nozzles canted relative to the axis of said ramjet casing to form spiral streams of the turbojet exhaust gases for creating a pumping action on the flow of air in said by pass flow passage, and augmentation of the jet thrust for turbojet operation, fuel supply means in said ramjet casing downstream of said convergent-divergent section, flameholder means downstream of said fuel supply means, said support means extending to at least the flameholder means.

6. The apparatus of claim 5 and including means to close the turbojet engine intake for converting said apparatus to ramjet engine operation alone, said closure means rendering said spin-jet device inoperative.

7. The jet thrust propulsion apparatus as set forth in claim 5 and including separate means at said turbojet casing inlet and jet thrust exhaust ends to regulate the flow in said bypass passage and at said jet thrust exhaust end respectively.

8. A jet thrust propulsion apparatus as set forth in claim 5 wherein the nozzles are canted at angles of between 10 degrees and 25 degrees.

References Cited
UNITED STATES PATENTS

| | | | |
|---|---|---|---|
| 2,955,414 | 10/1960 | Hausmann | 60—244 |
| 3,001,691 | 9/1961 | Salmon | 60—264 |
| 3,046,732 | 7/1962 | Foa | 60—269 |
| 3,091,082 | 5/1963 | Newcomb | 60—244 |
| 3,176,462 | 4/1965 | Eckert | 60—262 |
| 3,192,712 | 7/1965 | Nash | 60—244 |

FOREIGN PATENTS

| | | |
|---|---|---|
| 1,187,763 | 3/1959 | France. |

CARLTON R. CROYLE, *Primary Examiner.*

MARK NEWMAN, *Examiner.*

D. HART, *Assistant Examiner.*